United States Patent
Li et al.

(10) Patent No.: US 12,480,886 B2
(45) Date of Patent: Nov. 25, 2025

(54) CURVED SUBSTRATE BUBBLE DETECTION METHOD AND DETECTION SYSTEM

(71) Applicant: BOE TECHNOLOGY GROUP CO., LTD., Beijing (CN)

(72) Inventors: Xing Li, Beijing (CN); Ruize Li, Beijing (CN); Hao Tang, Beijing (CN); Ronghua Lan, Beijing (CN); Jiuyang Cheng, Beijing (CN); Meng Guo, Beijing (CN); Zhihui Yang, Beijing (CN); Qing Zhang, Beijing (CN); Xuehui Zhu, Beijing (CN); Quanguo Zhou, Beijing (CN); Lijia Zhou, Beijing (CN); Yong Qiao, Beijing (CN); Zhong Huang, Beijing (CN); Lirong Xu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/023,810

(22) PCT Filed: Mar. 1, 2022

(86) PCT No.: PCT/CN2022/078662
§ 371 (c)(1),
(2) Date: Feb. 28, 2023

(87) PCT Pub. No.: WO2023/164809
PCT Pub. Date: Sep. 7, 2023

(65) Prior Publication Data
US 2024/0288376 A1 Aug. 29, 2024

(51) Int. Cl.
*G01N 21/88* (2006.01)
*G01N 21/892* (2006.01)
(Continued)

(52) U.S. Cl.
CPC ....... *G01N 21/8851* (2013.01); *G01N 21/892* (2013.01); *G06T 7/0004* (2013.01);
(Continued)

(58) Field of Classification Search
CPC ............ G01N 21/8851; G01N 21/892; G01N 2021/8887; G01N 2021/891;
(Continued)

(56) References Cited

U.S. PATENT DOCUMENTS 6,512,239 B1 * 1/2003 Weiss .................. G01N 21/958
250/559.4
9,194,814 B2 * 11/2015 Numazu ............ G01N 21/9054

FOREIGN PATENT DOCUMENTS

CN 110969153 A 4/2020
CN 112184710 A 1/2021
(Continued)

*Primary Examiner* — Uzma Alam
(74) *Attorney, Agent, or Firm* — WHDA, LLP

(57) ABSTRACT

A curved substrate bubble detection method includes: providing, by a first light source and a second light source, parallel light incident to a to-be-tested substrate in different incident directions; obtaining, by a linear array camera, a first image including image information of a first side edge of the to-be-tested substrate; determining location information of a defect region of the to-be-tested substrate according to the first image, and generating a second image including image information of the defect region; binarizing the second image, and determining that the to-be-tested substrate has a bubble defect if there are at least two bright spots in an obtained binarized image, and a distance between any two first bright spots of at least two first bright spots is less than a first preset value. A curved substrate bubble detection system is also disclosed.

18 Claims, 3 Drawing Sheets

(51) Int. Cl.
    *G06T 7/00*           (2017.01)
    *G06T 7/13*           (2017.01)
    *G06V 10/44*         (2022.01)
    *G01N 21/89*         (2006.01)
    *H10K 71/70*         (2023.01)

(52) U.S. Cl.
    CPC ................ *G06T 7/13* (2017.01); *G06V 10/44* (2022.01); *G01N 2021/8887* (2013.01); *G01N 2021/891* (2013.01); *G01N 2201/0438* (2013.01); *G01N 2201/06146* (2013.01); *G06T 2207/30108* (2013.01); *H10K 71/70* (2023.02)

(58) Field of Classification Search
    CPC .. G01N 2201/0438; G01N 2201/06146; G06T 7/0004; G06T 7/13; G06T 2207/30108; G06V 10/44; H10K 71/70
    USPC ............................................ 356/237.1–237.5
    See application file for complete search history.

(56) References Cited

FOREIGN PATENT DOCUMENTS

| | | | |
|---|---|---|---|
| CN | 112414623 A | | 2/2021 |
| CN | 113245241 A | | 8/2021 |
| CN | 113628212 A | | 11/2021 |
| CN | 113706537 A | | 11/2021 |
| JP | 2002-310939 A | | 10/2002 |
| JP | 2007225553 A | * | 9/2007 |
| JP | 2008-102027 A | | 5/2008 |

\* cited by examiner providing, by a first light source and a second light source, parallel light incident to a to-be-tested substrate in different incident directions obtaining, by a linear array camera, a first image including image information of a first side edge of the to-be-tested substrate determining location information of a defect region of the to-be-tested substrate according to the first image, and generating a second image including image information of the defect region binarizing the second image, and determining that the to-be-tested substrate has a bubble defect in case that there are at least two bright spots in an obtained binarized image, and a distance between any two first bright spots of at least two first bright spots is less than a first preset value

Fig. 6

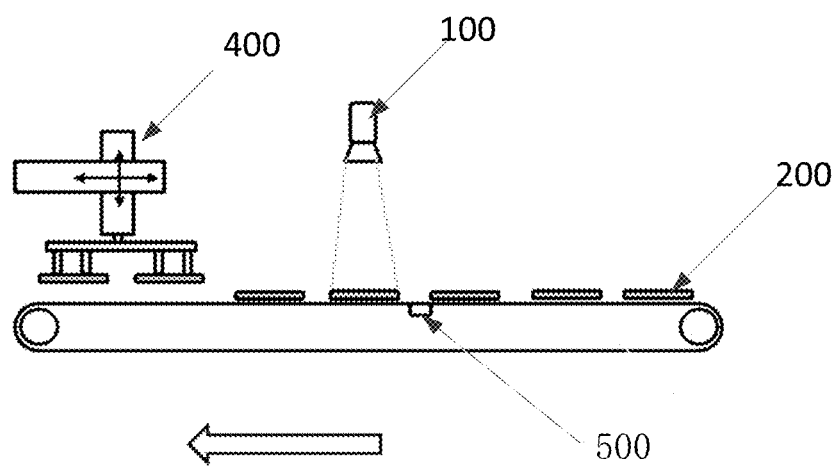

Fig. 7

CURVED SUBSTRATE BUBBLE DETECTION METHOD AND DETECTION SYSTEM

CROSS-REFERENCE TO RELATED APPLICATION

This application is the U.S. national phase of PCT Application No. PCT/CN2022/078662 filed on Mar. 1, 2022, the disclosure of which is hereby incorporated by reference in its entirety.

TECHNICAL FIELD

The present disclosure relates to the technical field of display product manufacture, and in particular, to a curved substrate bubble detection method and detection system.

BACKGROUND

When an OLED display is attached to a cover glass by means of an optical clear adhesive (OCA), some bubbles cannot be completely removed due to problems in the attachment and bubble removal processes, thus forming bubble defects, which are often located at the curved sides and R (rounded) corners of the curved screen. If a bubble can be detected before photocuring, then in most cases, the bubble may be removed through a secondary bubble removal process. However, if the bubble is not detected in time, and the product is not subjected to an optimization process before photocuring, the product will be scrapped, and more waste will be caused if the product enters a subsequent process. However, bubble defects cannot be detected in time due to the following reasons.

1. Timeliness of detection. OLED products must be cured within a certain time after attachment and bubble removal, otherwise micro-bubbles (which are not defects per se) will re-coalesce to form bubble defects. Therefore, after batch bubble removal is finished, the products need to be separately conveyed to a photocuring equipment in time, which also makes many detection methods inapplicable.

2. It is difficult to detect defects and there are many interference factors. Bubble defects are generally located in the regions of curved surfaces and R corners, and it is difficult for a common camera to detect defect features. Particles in the production line, stains, scratches and the like often interfere with the detection.

SUMMARY

In order to solve the above-mentioned technical problems, the present disclosure provides a curved substrate bubble detection method and detection system, which solve the problem that bubble defects cannot be detected timely and are difficult to detect.

In order to achieve the above object, the embodiments of the present disclosure adopt the following technical solutions. A curved substrate bubble detection method includes:
  providing, by a first light source and a second light source, parallel light incident to a to-be-tested substrate in different incident directions;
  obtaining a first image including image information of a first side edge of the to-be-tested substrate by a linear array camera, wherein the linear array camera is located in a transmission path of reflected light that is the parallel light provided by the first light source and specularly reflected off the to-be-tested substrate, and is located outside a transmission path of reflected light that is the parallel light provided by the second light source and specularly reflected off the to-be-tested substrate;
  determining location information of a defect region of the to-be-tested substrate according to the first image, and generating a second image including image information of the defect region; and
  binarizing the second image, and determining that the to-be-tested substrate has a bubble defect in case that there are at least two bright spots in an obtained binarized image, and a distance between any two first bright spots of at least two first bright spots is less than a first preset value.

Optionally, the determining location information of a defect region of the to-be-tested substrate according to the first image, and generating a second image including image information of the defect region specifically include:
  comparing brightness values of pixels in the first image with a first threshold value, adjusting the brightness value of any pixel whose brightness value is greater than the first threshold value to a first brightness value, and adjusting the brightness value of any pixel whose brightness value is less than the first threshold value to a second brightness value, wherein a location on the to-be-tested substrate corresponding to the pixel with the first brightness value is a location of the first side edge of the to-be-tested substrate, and the first side edge includes a straight portion and arc portions at two ends of the straight portion; and
  selecting, with the location of the first side edge as a reference, a rectangular area in each of regions of an active display region of the to-be-tested substrate that are close to the arc portions respectively to obtain the second image.

Optionally, the first image is a rectangular image, and has a length a in a first direction and a length b in a second direction, the first direction is an extending direction of the straight portion, and the second direction is perpendicular to the first direction:
  the selecting, with the location of the first side edge as the reference, the rectangular area in each of regions of the active display region of the to-be-tested substrate that are close to the arc portions respectively to obtain the second image specifically includes:
  establishing a coordinate system with the first direction being a y direction, the second direction being an x direction, and a vertex of the first image close to the first side edge being an origin;
  determining an intersection point (x, y) of an extension line of the straight portion and an extension line of a straight portion of a second side edge of the to-be-tested substrate according to the first side edge, and determining coordinates $(x+x_1, y)$ of a first vertex of the defect region according to the intersection point (x, y) and a distance $x_1$ between the first side edge and the active display region; and
  selecting a rectangular area in the active display region of the to-be-tested substrate on the basis of the first vertex to obtain the second image, wherein the length of an edge of the rectangular area in a direction parallel to the first direction is a preset value $y_1$, and the length of an edge of the rectangular area in the second direction is $b-x-x_1$.

Optionally, the binarizing the second image, and determining that the to-be-tested substrate has the bubble defect in case that there are at least two bright spots in the obtained binarized image, and the distance between any two first bright spots of the at least two first bright spots is less than the first preset value specifically include:

comparing brightness values of pixels in the second image with a second threshold value, adjusting the brightness value of any pixel whose brightness value is greater than the second threshold value to a third brightness value, and adjusting the brightness value of any pixel whose brightness value is less than the second threshold value to a fourth brightness value, a location corresponding to the pixel with the third brightness value being a location of the first bright spot; and comparing a distance between the two adjacent first bright spots with the first preset value, and determining that a location of the two adjacent first bright spots is a location of a bubble defect in case that the distance between the two adjacent first bright spots is less than the first preset value.

Optionally, before comparing the distance between the two adjacent first bright spots with the first preset value, the method further includes: screening the first bright spots for the first bright spot having a shape conforming to a bubble shape.

Optionally, before comparing brightness values of pixels in the second image with a second threshold value, the method further includes:

comparing brightness values of pixels in the second image with a third threshold value, adjusting the brightness value of any pixel whose brightness value is greater than the third threshold value to a fifth brightness value, and adjusting the brightness value of any pixel whose brightness value is less than the third threshold value to a sixth brightness value, a location corresponding to the pixel with the fifth brightness value being a location of a second bright spot, the third threshold value being less than the second threshold value; and determining that the second bright spot is a foreign matter defect in case that the second bright spot has a size greater than a second preset value, and has a shape not conforming to a bubble shape.

Optionally, before comparing brightness values of pixels in the second image with a third threshold value, the method further includes: filtering and dilating the second image.

An embodiment further provides a curved substrate bubble detection system for implementing the curved substrate bubble detection method as described above. The curved substrate bubble detection system includes an image acquisition structure including a linear array camera, a first light source and a second light source, wherein the linear array camera is located in a transmission path of reflected light that is the parallel light provided by the first light source and specularly reflected off the to-be-tested substrate, and is located outside a transmission path of reflected light that is the parallel light provided by the second light source and specularly reflected off the to-be-tested substrate:

the linear array camera is configured to obtain a first image including image information of an edge of the to-be-tested substrate;

the curved substrate bubble detection system further includes a first processing structure configured to determine location information of a defect region of the to-be-tested substrate according to the first image, and generate a second image including image information of the defect region; and the curved substrate bubble detection system further includes a second processing structure configured to binarize the second image, and determine that the to-be-tested substrate has a bubble defect in case that there are at least two bright spots in an obtained binarized image, and a distance between any two first bright spots of at least two first bright spots is less than a first preset value.

Optionally, the first processing structure is configured to compare brightness values of pixels in the first image with a first threshold value, adjust the brightness value of any pixel whose brightness value is greater than the first threshold value to a first brightness value, and adjust the brightness value of any pixel whose brightness value is less than the first threshold value to a second brightness value, a location on the to-be-tested substrate corresponding to the pixel with the first brightness value being a location of the first side edge of the to-be-tested substrate, wherein the first side edge includes a straight portion and arc portions at two ends of the straight portion;

the first processing structure is further configured to select, with the location of the first side edge as a reference, a rectangular area in each of regions of an active display region of the to-be-tested substrate that are close to the arc portions respectively to obtain the second image.

Optionally, the first image is a rectangular image, and has a length a in a first direction and a length b in a second direction, the first direction is an extending direction of the straight portion, and the second direction is perpendicular to the first direction:

the first processing structure is further configured to establish a coordinate system with the first direction being a y direction, the second direction being an x direction, and a vertex of the first image close to the first side edge being an origin;

the first processing structure is further configured to determine an intersection point (x, y) of an extension line of the straight portion and an extension line of the straight portion of the second side edge of the to-be-tested substrate according to the first side edge, and determine coordinates $(x+x_1, y)$ of a first vertex of the defect region according to the intersection point (x, y) and a distance $x_1$ between the first side edge and the active display region; and the first processing structure is further configured to select a rectangular area in the active display region of the to-be-tested substrate on the basis of the first vertex to obtain the second image, wherein the length of an edge of the rectangular area in a direction parallel to the first direction is a preset value $y_1$, and the length of an edge of the rectangular area in the second direction is $b-x-x_1$.

Optionally, the second processing structure is configured to compare brightness values of pixels in the second image with a second threshold value, adjust the brightness value of any pixel whose brightness value is greater than the second threshold value to a third brightness value, and adjust the brightness value of any pixel whose brightness value is less than the second threshold value to a fourth brightness value, a location corresponding to the pixel with the third brightness value being a location of a first bright spot;

the second processing structure is further configured to compare a distance between two adjacent first bright spots with the first preset value, and determine that a location of the two adjacent first bright spots is a location of a bubble defect in case that the distance between the two adjacent first bright spots is less than the first preset value.

Optionally, the second processing structure is further configured to screen the first bright spots for the first bright spot having a shape conforming to a bubble shape.

Optionally, the second processing structure is further configured to compare brightness values of pixels in the second image with a third threshold value, adjust the brightness value of any pixel whose brightness value is greater than the third threshold value to a fifth brightness value, and adjust the brightness value of any pixel whose brightness value is less than the third threshold value to a sixth brightness value, a location corresponding to the pixel with the fifth brightness value being a location of a second bright spot, the third threshold value being less than the second threshold value;

the second processing structure is further configured to determine that the second bright spot is a foreign matter defect in case that the second bright spot has a size greater than a second preset value, and has a shape not conforming to a bubble shape.

Optionally, the second processing structure is further configured to filter and dilate the second image.

The present disclosure has the following beneficial effects. The image information of the first side edge of the to-be-tested substrate is obtained first, and then the location information of the defect region is determined according to the first side edge, which is simple and efficient, without setting a detection mark on the to-be-tested substrate. Besides, the linear array camera operates in cooperation with the first light source and the second light source which emit incident light in different directions, so that a bubble defect appears as a combination of multiple spaced bright spots, thereby improving detection efficiency and reducing detection difficulty.

BRIEF DESCRIPTION OF THE DRAWINGS

FIG. 6 is a flowchart of a curved substrate bubble detection method; and

FIG. 7 is a schematic diagram showing the structure of a curved substrate bubble detection system.

DETAILED DESCRIPTION

In order that the objects, technical solutions and advantages of the embodiments of the present disclosure will become more apparent, a more particular description of the embodiments of the present disclosure will be rendered with reference to the appended drawings. It is to be understood that the described embodiments are part, but not all, of the disclosed embodiments. Based on the embodiments of the present disclosure described, all other embodiments available to one of ordinary skill in the art are within the scope of the present disclosure.

In describing the present disclosure, It is to be noted that the terms "central", "upper", "lower", "left", "right", "vertical", "horizontal", "inner", "outer", and the like indicate orientations or positional relationships based on the orientations or positional relationships shown in the figures, are merely intended to facilitate description of the present disclosure and simplify the description, and do not indicate or imply that the referenced devices or elements must have a particular orientation, be constructed and operated in a particular orientation, and thus should not be construed as limiting the present disclosure. Furthermore, the terms "first", "second", and "third" are used for descriptive purposes only and are not to be construed as indicating or implying relative importance.

Figure 1:
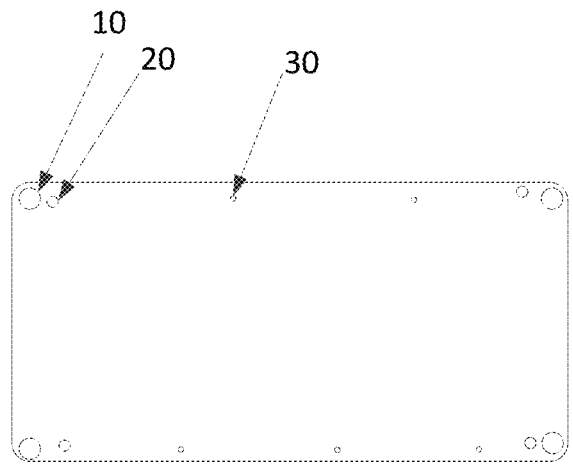
FIG. 1 is a thermodynamic diagram showing the occurrence of defects in the related art.

Bubble defects tend to occur after the curved side of an OLED curved screen is attached and subjected to bubble removal, and the rate of occurrence of such defects is between 0.1% and 3%. FIG. 1 is a thermodynamic diagram showing the occurrence of defects in a prior art product during a certain period of time. It can be seen that most defects occur in the regions of R corners. A place in FIG. 1 being labeled with 10 represents that the occurrence rate of bubble is greater than 20% in the place. A place in FIG. 1 being labeled with 20 represents that the occurrence rate of bubble is greater than 3% in the place. A place in FIG. 1 being labeled with 30 represents that the occurrence rate of bubble is less than 1% in the place.

Since the products need to be separately conveyed to a UV chamber for curing within a certain period of time (generally, but not limited to, 30 minutes) after batch bubble removal is completed, in order to eliminate bubble defects, it is necessary to conduct full inspection on the products to intercept bubble defects before the products are conveyed into the UV chamber. A manual full inspection obviously cannot satisfy the requirement of timeliness. It is costly to develop dedicated detection equipment to cope with the bubble defects, which requires the investment on a large number of hardware equipment such as optics equipment, logistics equipment, industrial personal computers and so on, and consumes a lot of space to install the equipment. These factors are not conducive to bubble interception in an established production line.

The conventional charge coupled device (CCD) image acquisition scheme has three disadvantages. 1. The bubble defects cannot be detected. In the curved screen failure inspection using the traditional CCD scheme, the curved side is a visual field failure region, so it is difficult to detect bubble defects. 2. Detection accuracy is insufficient. Although the bubble diameter is generally >50 μm, the feature size of the bubble in the image is much smaller than its actual size because the bubble has light transmittance, thus it is difficult for a common CCD scheme camera to detect the defect feature. 3. In a traditional CCD scheme, the sample is usually in a stationary state or a slow moving state when images are captured, and it takes more time to perform batch inspection, which cannot meet the timeliness requirement on bubble detection.

Referring to FIG. 6, to solve the foregoing problem, an embodiment of the present disclosure provides a curved substrate bubble detection method, including:

providing, by a first light source and a second light source, parallel light incident to a to-be-tested substrate 200 in different incident directions;

obtaining a first image including image information of a first side edge 1 of the to-be-tested substrate 200 by a linear array camera 100, wherein the linear array camera 100 is located in a transmission path of reflected light that is the parallel light provided by the first light source and specularly reflected off the to-be-tested substrate 200, and is located outside a transmission path of reflected light that is the parallel light provided by the second light source and specularly reflected off the to-be-tested substrate 200;

determining location information of a defect region of the to-be-tested substrate 200 according to the first image, and generating a second image including image information of the defect region; and binarizing the second image, and determining that the to-be-tested substrate 200 has a bubble defect in case that there are at least two bright spots in an obtained binarized image, and a distance between any two first bright spots of at least two first bright spots is less than a first preset value.

According to the above-mentioned solution, image information of a first side edge 1 of the to-be-tested substrate 200 is obtained firstly, and then the location information of the defect region is determined according to the first side edge 1, the process is simple and efficient, without having to disposing a detection mark on the to-be-tested substrate 200 (the detection mark disposed on the to-be-tested substrate is below a cover glass, and cannot be easily detected). After the second image including the image information of the defect region is obtained, subsequent detections of bubble defects are all performed on the second image with a small size, and the number of processing steps is small, thus the processing time of a single image can be less than 100 ms, and the product with the bubble defect may be picked out immediately after the defect is detected, which completely satisfies the demand on immediate sorting in the production line: as a result, the moving speed of the to-be-tested substrate may reach 300 mm/s to 1000 mm/s, thereby improving the efficiency.

Figure 3:
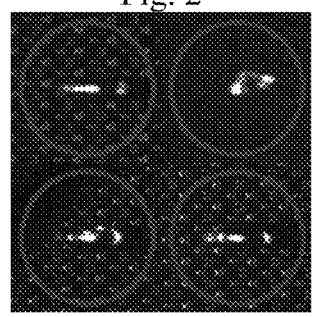
FIG. 3 is a schematic diagram showing optical images of bubbles.
Figure 4:
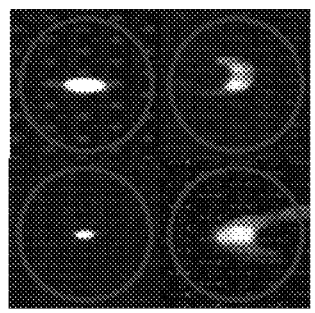
FIG. 4 is a schematic diagram showing images of foreign interferences.

In addition, the linear array camera 100 operates in cooperation with the first light source and the second light source which emit incident light in different directions, so that a bubble defect appears as a combination of multiple spaced bright spots, see FIG. 3, while other foreign matter defect appears as one bright spot, see FIG. 4, thereby the bubble features are highlighted, which improves the detection efficiency and reduces the detection difficulty.

It is to be noted that in this embodiment, a plurality of light sources providing incident light in different respective directions are used cooperatively, and the number of the light sources is not limited to the two light sources: the first light source and the second light source.

Figure 2:
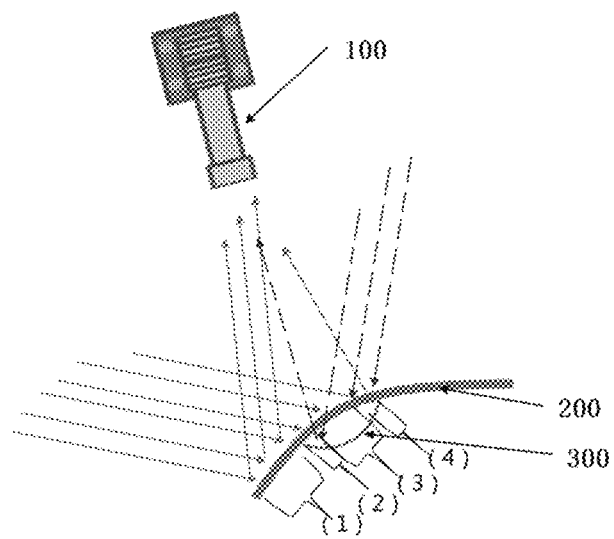
FIG. 2 is a schematic diagram of an image acquisition structure according to an embodiment of the present disclosure.

The solid arrows in FIG. 2 represent light rays of the first light source (including incident light and reflected light), and the dashed arrows represent light rays of the second light source (including incident light and reflected light): since the linear array camera 100 is located in the transmission path of the reflected light that is the parallel light provided by the first light source and specularly reflected off the to-be-tested substrate 200, a strong reflection region is formed at the location of the first side edge 1 (region (1) in FIG. 2), so that the first side edge 1 is highlighted in the first image. The linear array camera 100 is located outside the transmission path of the reflected light that is the parallel light provided by the second light source and specularly reflected off the to-be-tested substrate 200, then in the case that there is no bubble defect in the to-be-tested substrate 200, the linear array camera 100 cannot receive the reflected light, that is to say, a dark field would be formed in a corresponding region; and in the case that the to-be-tested substrate 200 has a bubble defect, the linear array camera 100 would receive corresponding reflected light due to diffuse reflection, and a bright spot is formed in the bubble defect region, highlighting the bubble feature, and the bubble defect is detected.

It is to be noted that in this embodiment, the first light source and the second light source which provide incident light in different incident directions are used. Due to the influence of factors such as the light transmittance and morphological characteristics of bubbles, and the incident direction of the incident light, some regions (e.g., an edge region) of the bubble give rise to strong reflected light. Therefore, a bubble defect leads to multiple bright spots (a combination of multiple bright spots with a relatively small spacing) in the obtained image, see FIG. 3; while other foreign matter defect leads to one complete and continuous bright spot, see FIG. 4, thus the feature of the bubble defect is enhanced, which improves the detection efficiency. As shown in FIG. 2, for a bubble 300, the region (2) and the region (4) are strongly reflective regions, the region (3) is a weakly reflective region, and a combination of two spaced bright spots is present in the image.

Illustratively, the determining the location information of a defect region of the to-be-tested substrate 200 according to the first image, and generating a second image including the image information of the defect region specifically include:

comparing brightness values of pixels in the second image with a first threshold value, adjusting the brightness value of any pixel whose brightness value is greater than the first threshold value to a first brightness value, and adjusting the brightness value of any pixel whose brightness value is less than the first threshold value to a second brightness value, a location on the to-be-tested substrate 200 corresponding to the pixel with the first brightness value being a location of the first side edge 1 of the to-be-tested substrate 200, wherein the first side edge 1 includes a straight portion and arc portions at two opposite ends of the straight portion; and selecting, with the location of the first side edge 1 as a reference, a rectangular area in each of regions of an active display region of the to-be-tested substrate 200 that are close to the arc portions respectively, to obtain the second image.

When a first image is being obtained, the first light source is located at the outside, which is the side close to the first side edge 1, of the to-be-tested substrate 200; since the linear array camera 100 is located in the transmission path of the reflected light that is the parallel light provided by the first light source and specularly reflected off the to-be-tested substrate 200, a strong reflection region is formed at the location of the first side edge 1; binarization processing is performed on the obtained first image; a bright region is formed at the location corresponding to the first side edge 1, and dark regions are formed at other regions; and with the location of the first side edge 1 as a reference, a rectangular area is selected in each of regions of the active display region of the to-be-tested substrate 200 that are close to the arc portions respectively, wherein the rectangular area is a region with a high occurrence rate of bubble defects (namely, a region represented by 10 in FIG. 1), and subsequent detection only needs to be directed to a second image including image information of the defect region, so as to improve the detection timeliness.

Figure 5:
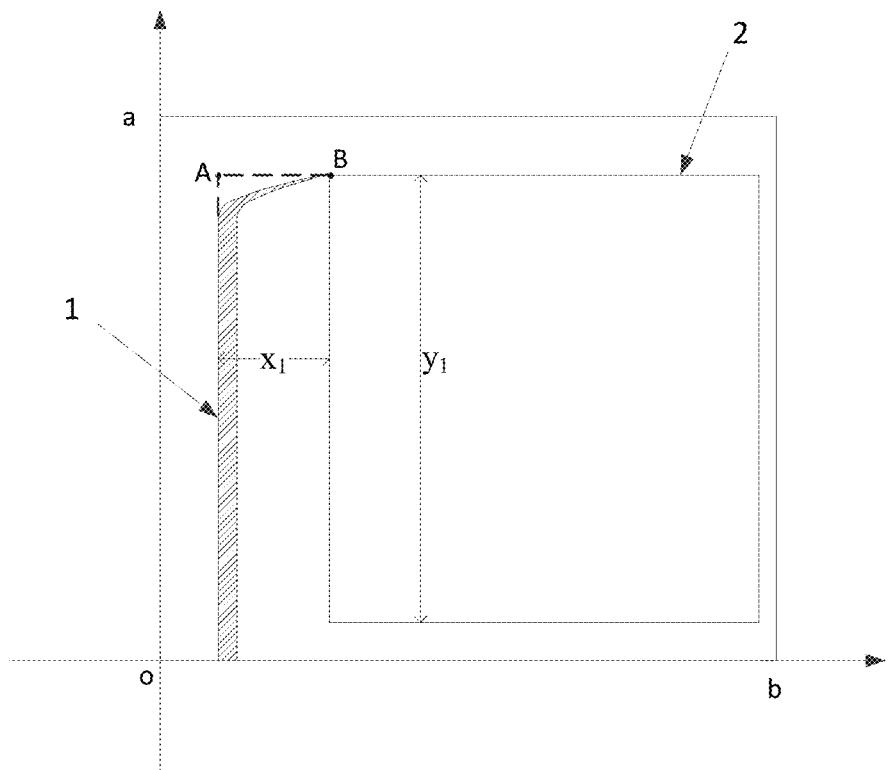
FIG. 5 is a schematic diagram illustrating the principle of obtaining a second image.

Illustratively, a detailed description is given by taking selecting a rectangular area in a region, close to one arc portion, of the active display region of the to-be-tested substrate 200 as an example. With reference to FIG. 5, the first image is a rectangular image, and has a length a in a first direction and a length b in a second direction, the first direction is an extending direction of the straight portion, and the second direction is perpendicular to the first direction:

selecting, with the location of the first side edge 1 as a reference, a rectangular area 2 in each of regions of the active display region of the to-be-tested substrate 200 that are close to the arc portions respectively to obtain the second image specifically includes:

establishing a coordinate system with the first direction being a y direction, the second direction being an x direction, and one vertex O of the first image close to the first side edge 1 being an origin;

determining an intersection point A (x, y) of an extension line of the straight portion and an extension line of a straight portion of a second side edge of the to-be-tested substrate 200 according to the first side edge 1, and determining coordinates $(x+x_1, y)$ of a first vertex B of the defect region according to the intersection point A (x, y) and a distance $x_1$ between the first side edge 1 and the active display region; and selecting a rectangular area 2 in the active display region of the to-be-tested substrate 200 on the basis of the first vertex B to obtain the second image, wherein the length of an edge of the rectangular area 2 in a direction parallel to the first direction is a preset value $y_1$, and the length of an edge of the rectangular area in the second direction is $b-x-x_1$.

With reference to FIG. 2, a coordinate system is established with the first direction being a y direction, the second direction being an x direction, and one vertex O of the first image close to the first side edge 1 being an origin, so as to determine the location information of the first side edge 1, the intersection point A (x, y) is then obtained according to the first side edge 1, and the coordinates $(x+x_1, y)$ of the first vertex B of the defect region are determined according to the width $x_1$ between the active display region and the edge, thereby the rectangular area 2 is selected, to obtain the second image including the defect region.

It is to be noted that, since the bubble defect occurrence regions are mainly concentrated in the curved surface and R corner regions, it is not necessary to obtain an entire image of the to-be-tested substrate 200 in the image obtaining step, but only a part of the image needs to be obtained. The first image in the embodiment of the present disclosure is a rectangular image having a length a in a first direction and a length b in a second direction, but the size of the first image is not limited thereto, where a and b are both greater than zero, and a is greater than the length of the first side edge 1 of the to-be-tested substrate 200 (so as to avoid the problem of incomplete image acquisition due to shift of the location of the to-be-tested substrate 200), b is greater than the length of the non-display region of the to-be-tested substrate 200 in the second direction (that is, the first image includes an image of the active display region), and the obtained first image at least includes a region with a higher rate of occurrence of bubble defects (such as an R corner region).

It is to be noted that, the length of the side of the rectangular area 2 in a direction parallel to the first direction is a preset value $y_1$, which may be set according to practical requirements, and for example may be one third, one half, etc. of the length of the first side edge 1 in its extension direction.

It is to be noted that, the first side edge 1 has two opposite ends, and correspondingly there are two defect regions on one side of the to-be-tested substrate 200 close to the first side edge 1, and these two defect regions are included simultaneously in the obtained first image: only one region is shown in FIG. 2, and the obtaining method and principle for the other region is the same, and the description thereof will not be repeated here.

The to-be-tested substrate 200 includes the first side edge 1 and a second side edge opposite to and parallel to the first side edge 1, and there are regions where bubble defects are likely to occur on both the side of the first side edge 1 and the side of the second side edge, with reference to FIG. 1: in order to improve the detection efficiency, a linear array camera 100 may be arranged on the side of the second side edge at the same time so as to obtain an image including a preset region on the side of the second side edge, and the acquisition method and principle are the same as above.

Since the third side edge and the fourth side edge adjacent to the first side edge 1 on the to-be-tested substrate 200 are arranged as a curved surface, bubble defects are easily generated in the curved surface regions as well, and the above-mentioned method can also be used to detect bubble defects in corresponding regions of the third side edge and the fourth side edge.

Illustratively, the binarizing the second image, and determining that the to-be-tested substrate 200 has a bubble defect in case that there are at least two bright spots in an obtained binarized image, and a distance between any two first bright spots of at least two first bright spots is less than a first preset value specifically include:

comparing brightness values of pixels in the second image with a second threshold value, adjusting the brightness value of any pixel whose brightness value is greater than the second threshold value to a third brightness value, and adjusting the brightness value of any pixel whose brightness value is less than the second threshold value to a fourth brightness value, a location corresponding to the pixel with the third brightness value being a location of a first bright spot; and comparing a distance between the two adjacent first bright spots with the first preset value, and determining that a location of the two adjacent first bright spots is a location of a bubble defect in case that the distance between the two adjacent first bright spots is less than the first preset value.

Incident light of different incident directions is provided by the first light source and the second light source, so that a combination of a plurality of spaced bright spots appears at the location in the image corresponding to the bubble, but due to the limitation of the size of the bubble itself, if the distance between two adjacent bright spots in the image is too large, then the defect is not a bubble defect. The accuracy of the detection of the bubble defect can be improved by the comparison of the distance between adjacent bright spots.

Illustratively, before comparing a distance between the two adjacent first bright spots with the first preset value, the method further includes: screening the first bright spots for the first bright spot having a shape conforming to a bubble shape.

The shape, size, length-width ratio, etc. of the bubbles are different from other foreign matters (e.g., metal wires, which also reflect light when illuminated), and the detection efficiency can be improved by pre-screening according to the shape characteristics.

Illustratively, before comparing brightness values of pixels in the second image with a second threshold value, the method further includes:

comparing brightness values of pixels in the second image with a third threshold value, adjusting the brightness value of any pixel whose brightness value is greater than the third threshold value to a fifth brightness value, and adjusting the brightness value of any pixel whose brightness value is less than the third threshold value to a sixth brightness value, a location corresponding to the pixel with the fifth brightness value being a location of a second bright spot, the third threshold value being less than the second threshold value; and determining that the second bright spot is a foreign matter defect in case that the second bright spot has a size greater than a second preset value, and has a shape not conforming to a bubble shape.

With the above-mentioned scheme, interference can be eliminated before the detection of bubble defects, thereby improving the detection accuracy.

It is to be noted that, in general, the brightness is relatively high at the location of the bubble defect: in contrast, the brightness of the center of the interference may reach the brightness level of the bubble, but the edge of the interference is not obvious, and has a lower average brightness, therefore, in order to better eliminate the interference, the third threshold value is set to be less than the second threshold value. For example, in the interference image at the lower right corner of FIG. 4, the center has the same brightness as the bubble, but there is a periphery region with a lower brightness. At this time, if the third threshold value is set to be less than the second threshold value, the brightness values of the pixels in the periphery region with a lower brightness and the brightness values of the pixels in the central region can both be converted into a fifth brightness value through binarization, so as to highlight the shape of the interference, thereby facilitate distinguishing interference from the bubble, and facilitate the elimination of interference.

Illustratively, before comparing brightness values of pixels in the second image with a third threshold value, the method further includes: filtering and dilating the second image. The filtering eliminates noise points, and the dilation enhances defect features, thereby improving detection accuracy, and greatly reducing the risk of over-detection.

Illustratively, the curved substrate bubble detection method according to an embodiment further includes:

when the to-be-tested substrate 200 is located at a test location, starting the linear array camera 100, the first light source and the second light source to obtain images automatically.

An embodiment further provides a curved substrate bubble detection system for implementing the curved substrate bubble detection method as described above. The curved substrate bubble detection system includes an image acquisition structure including a linear array camera 100, a first light source and a second light source, wherein the linear array camera 100 is located in a transmission path of reflected light that is the parallel light provided by the first light source and specularly reflected off the to-be-tested substrate 200, and is located outside a transmission path of reflected light that is the parallel light provided by the second light source and specularly reflected off the to-be-tested substrate 200;

the linear array camera 100 is configured to obtain a first image including image information of an edge of the to-be-tested substrate 200;

the curved substrate bubble detection system further includes a first processing structure configured to determine location information of a defect region of the to-be-tested substrate 200 according to the first image, and generate a second image including image information of the defect region; and the curved substrate bubble detection system further includes a second processing structure configured to binarize the second image, and determine that the to-be-tested substrate 200 has a bubble defect in case that there are at least two bright spots in an obtained binarized image, and a distance between any two first bright spots of at least two first bright spots is less than a first preset value.

According to the above-mentioned solution, image information of a first side edge 1 of the to-be-tested substrate 200 is obtained firstly, and then the location information of the defect region is determined according to the first side edge 1, the process is simple and efficient, without having to disposing a detection mark on the to-be-tested substrate 200 (the detection mark disposed on the to-be-tested substrate is below a cover glass, and cannot be easily detected). After the second image including the image information of the defect region is obtained, subsequent detections of bubble defects are all performed on the second image with a small size, and the number of processing steps is small, thus the processing time of a single image can be less than 100 ms, and the product with the bubble defect may be picked out immediately after the defect is detected, which completely satisfies the demand on immediate sorting in the production line.

It is to be noted that, in this embodiment, with the arrangement of the image acquisition structure including the linear array camera 100, the first light source and the second light source, bubble defect detection is performed on a region of the to-be-tested substrate 200 close to the first side edge 1; the to-be-tested substrate 200 further includes a second side edge opposite to and parallel to the first side edge 1, and there are regions where bubble defects are likely to occur on both the side of the first side edge 1 and the side of the second side edge, with reference to FIG. 1; in order to improve the detection efficiency, the aforementioned image acquisition structure including the linear array camera 100 may be arranged on the side of the second side edge at the same time so as to obtain an image including a preset region on the side of the second side edge, and the acquisition method and principle are the same as above.

Since the third side edge and the fourth side edge adjacent to the first side edge 1 on the to-be-tested substrate 200 are arranged as a curved surface, bubble defects are easily generated in the curved surface regions as well. The above-mentioned optical assembly may also be arranged on the third side edge and the fourth side edge so as to use the above-mentioned principle to detect bubble defects in corresponding regions, that is, four sets of the above-mentioned image acquisition structures are arranged to improve the time efficiency of detection. Alternatively, a moving structure can be used to rotate the to-be-tested substrate 200, so that the same image acquisition structure can be used to perform multiple detections, thereby reducing the cost, but the time efficiency of detection will be relatively reduced.

Illustratively, the first processing structure is configured to compare brightness values of pixels in the first image with a first threshold value, adjust the brightness value of any pixel whose brightness value is greater than the first threshold value to a first brightness value, and adjust the brightness value of any pixel whose brightness value is less than the first threshold value to a second brightness value, wherein a location on the to-be-tested substrate 200 corresponding to the pixel with the first brightness value is a location of the first side edge 1 of the to-be-tested substrate 200, the first side edge 1 includes a straight portion and arc portions at two opposite ends of the straight portion;

the first processing structure is further configured to select, with the location of the first side edge 1 as a reference, a rectangular area in each of regions of an active display region of the to-be-tested substrate 200 that are close to the arc portions respectively to obtain the second image.

Illustratively, the first image is a rectangular image, and has a length a in a first direction and a length b in a second direction, the first direction is an extending direction of the straight portion, and the second direction is perpendicular to the first direction:

the first processing structure is further configured to establish a coordinate system with the first direction being a y direction, the second direction being an x direction, and a vertex of the first image close to the first side edge 1 being an origin;

the first processing structure is further configured to determine an intersection point A (x, y) of an extension line of the straight portion and an extension line of the straight portion of the second side edge of the to-be-tested substrate 200 according to the first side edge 1, and determine coordinates (x+$x_1$, y) of a first vertex B of the defect region according to the intersection point (x, y) and a distance $x_1$ between the first side edge 1 and the active display region; and the first processing structure is further configured to select a rectangular area in the active display region of the to-be-tested substrate 200 on the basis of the first vertex to obtain the second image, wherein the length of an edge of the rectangular area in a direction parallel to the first direction is a preset value $y_1$, and the length of an edge of the rectangular area in the second direction is b-x-$x_1$.

Illustratively, the second processing structure is configured to compare brightness values of pixels in the second image with a second threshold value, adjust the brightness value of any pixel whose brightness value is greater than the second threshold value to a third brightness value, and adjust the brightness value of any pixel whose brightness value is less than the second threshold value to a fourth brightness value, a location corresponding to the pixel with the third brightness value being a location of a first bright spot:

the second processing structure is further configured to compare a distance between the two adjacent first bright spots with the first preset value, and determine that a location of the two adjacent first bright spots is a location of a bubble defect in case that the distance between the two adjacent first bright spots is less than the first preset value.

Illustratively, the second processing structure is further configured to screen the first bright spots for the first bright spot having a shape conforming to a bubble shape.

Illustratively, the second processing structure is further configured to compare brightness values of pixels in the second image with a third threshold value, adjust the brightness value of any pixel whose brightness value is greater than the third threshold value to a fifth brightness value, and adjust the brightness value of any pixel whose brightness value is less than the third threshold value to a sixth brightness value, a location corresponding to the pixel with the fifth brightness value being a location of a second bright spot, the third threshold value being less than the second threshold value:

the second processing structure is further configured to determine that the second bright spot is a foreign matter defect in case that the second bright spot has a size greater than a second preset value, and has a shape not conforming to a bubble shape.

Illustratively, the second processing structure is further configured to filter and dilate the second image.

Illustratively, the first light source and the second light source are both a monochromatic point light source, preferably a blue monochromatic point light source. The blue point light source have the features of short wavelength and good penetration.

Illustratively, the linear array camera 100 has a resolution >5 μm/pixel.

Illustratively, the curved substrate bubble detection system further includes a sensor 500 configured to transmit a signal when the to-be-tested substrate 200 is at a test location, a control unit for controlling the operation state of the image acquisition structure receives the signal to control the image acquisition structure to start image acquisition.

Illustratively, the control unit may be a programmable logic controller (PLC).

Illustratively, the curved substrate bubble detection system further includes a sorting and picking assembly 400 for picking away a defective product if the second processing structure determines that a to-be-tested substrate has a bubble defect.

With reference to FIG. 7, the curved substrate bubble detection system includes a conveyor belt for conveying the to-be-tested substrate 200, a sensor 500 is located on one side of the conveyor belt, an image acquisition structure including the linear array camera 100, the first light source and the second light source is located above the to-be-tested substrate 200, and the sorting and picking assembly 400 is located downstream of the image acquisition structure.

When the to-be-tested substrate 200 moves at a preset speed and passes by the sensor 500, the sensor 500 transmits a signal to the PLC, to trigger the image acquisition structure to start image acquisition and stop image acquisition after a certain time T, the time T being determined by the size of the to-be-tested substrate 200 and the moving speed of the to-be-tested substrate 200. Then, the image data is transmitted to a personal computer (PC) (including the first processing structure and the second processing structure) for determination, and if the determination result is no good (NG), the gripper of the sorting and picking assembly 400 at the back end directly picks out the NG product for optimization, otherwise, the product is directly conveyed to a downstream process. The moving speed of the to-be-tested substrate 200 may reach a maximum of 1000 mm/s, thus the production line does not need to be slowed down or halted for the purpose of image acquisition, and the normal tape-out speed will not be affected.

It is to be understood that the above-described implementations are merely exemplary implementations employed to illustrate the principles of the present disclosure, and that the disclosure is not limited thereto. It will be apparent to those skilled in the art that various modifications and improvements can be made in the present disclosure without departing from the spirit or scope of the disclosure. These modifications and improvements should be deemed as falling within the scope of the present disclosure.

What is claimed is:

1. A curved substrate bubble detection method, comprising:
    providing, by a first light source and a second light source, parallel light incident to a to-be-tested substrate in different incident directions;
    obtaining, by a linear array camera, a first image comprising image information of a first side edge of the to-be-tested substrate, wherein the linear array camera is located in a transmission path of reflected light that is the parallel light provided by the first light source and specularly reflected off the to-be-tested substrate, and is located outside a transmission path of reflected light that is the parallel light provided by the second light source and specularly reflected off the to-be-tested substrate;

determining location information of a defect region of the to-be-tested substrate according to the first image, and generating a second image comprising image information of the defect region; and binarizing the second image, and determining that the to-be-tested substrate has a bubble defect in case that there are at least two bright spots in an obtained binarized image, and a distance between any two first bright spots of at least two first bright spots is less than a first preset value, wherein the determining of the location information of the defect region of the to-be-tested substrate according to the first image, and the generating of the second image comprising image information of the defect region specifically comprise:

comparing brightness values of pixels in the first image with a first threshold value, adjusting the brightness value of any pixel whose brightness value is greater than the first threshold value to a first brightness value, and adjusting the brightness value of any pixel whose brightness value is less than the first threshold value to a second brightness value, wherein a location on the to-be-tested substrate corresponding to the pixel with the first brightness value is a location of the first side edge of the to-be-tested substrate, the first side edge comprising a straight portion and arc portions at two ends of the straight portion; and selecting, with the location of the first side edge as a reference, a rectangular area in each of regions of an active display region of the to-be-tested substrate that are close to the arc portions respectively to obtain the second image.

2. The curved substrate bubble detection method according to claim 1, wherein the first image is a rectangular image, and has a length a in a first direction and a length b in a second direction, the first direction is an extending direction of the straight portion, and the second direction is perpendicular to the first direction;

the selecting, with the location of the first side edge as the reference, the rectangular area in each of regions of the active display region of the to-be-tested substrate that are close to the arc portions respectively to obtain the second image specifically comprises:

establishing a coordinate system with the first direction being a y direction, the second direction being an x direction, and a vertex of the first image close to the first side edge being an origin;

determining an intersection point (x, y) of an extension line of the straight portion and an extension line of a straight portion of a second side edge of the to-be-tested substrate according to the first side edge, and determining coordinates (x+x1, y) of a first vertex of the defect region according to the intersection point (x, y) and a distance x1 between the first side edge and the active display region; and selecting a rectangular area in the active display region of the to-be-tested substrate on the basis of the first vertex to obtain the second image, wherein a length of an edge of the rectangular area in a direction parallel to the first direction is a preset value y1, and a length of an edge of the rectangular area in the second direction is b−x−x1.

3. The curved substrate bubble detection method according to claim 1, wherein the binarizing the second image, and determining that the to-be-tested substrate has the bubble defect in case that there are at least two bright spots in the obtained binarized image, and a distance between any two first bright spots of the at least two first bright spots is less than the first preset value specifically comprise:

comparing brightness values of pixels in the second image with a second threshold value, adjusting the brightness value of any pixel whose brightness value is greater than the second threshold value to a third brightness value, and adjusting the brightness value of any pixel whose brightness value is less than the second threshold value to a fourth brightness value, a location corresponding to the pixel with the third brightness value being a location of the first bright spot; and comparing a distance between two adjacent first bright spots with the first preset value, and determining that a location of the two adjacent first bright spots is a location of a bubble defect in case that the distance between the two adjacent first bright spots is less than the first preset value.

4. The curved substrate bubble detection method according to claim 3, wherein before comparing the distance between the two adjacent first bright spots with the first preset value, the method further comprises: screening the first bright spots for the first bright spot having a shape conforming to a bubble shape.

5. The curved substrate bubble detection method according to claim 3, wherein before comparing the brightness values of the pixels in the second image with the second threshold value, the method further comprises:

comparing the brightness values of the pixels in the second image with a third threshold value, adjusting the brightness value of any pixel whose brightness value is greater than the third threshold value to a fifth brightness value, and adjusting the brightness value of any pixel whose brightness value is less than the third threshold value to a sixth brightness value, a location corresponding to the pixel with the fifth brightness value being a location of a second bright spot, the third threshold value being less than the second threshold value; and determining that the second bright spot is a foreign matter defect in case that the second bright spot has a size greater than a second preset value, and has a shape not conforming to a bubble shape.

6. The curved substrate bubble detection method according to claim 5, wherein before comparing the brightness values of the pixels in the second image with the third threshold value, the method further comprises: filtering and dilating the second image.

7. A curved substrate bubble detection system for implementing a curved substrate bubble detection method, wherein the curved substrate bubble detection method comprises:

providing, by a first light source and a second light source, parallel light incident to a to-be-tested substrate in different incident directions;

obtaining, by a linear array camera, a first image comprising image information of a first side edge of the to-be-tested substrate, wherein the linear array camera is located in a transmission path of reflected light that is the parallel light provided by the first light source and specularly reflected off the to-be-tested substrate, and is located outside a transmission path of reflected light that is the parallel light provided by the second light source and specularly reflected off the to-be-tested substrate;

determining location information of a defect region of the to-be-tested substrate according to the first image, and generating a second image comprising image information of the defect region; and binarizing the second image, and determining that the to-be-tested substrate has a bubble defect in case that there are at least two bright spots in an obtained binarized image, and a distance between any two first bright spots of at least two first bright spots is less than a first preset value, wherein the curved substrate bubble detection system comprises an image acquisition structure, the image acquisition structure comprises the linear array camera, the first light source and the second light source, the linear array camera is located in the transmission path of reflected light that is parallel light provided by the first light source and specularly reflected off the to-be-tested substrate, and is located outside the transmission path of reflected light that is parallel light provided by the second light source and specularly reflected off the to-be-tested substrate, the linear array camera is configured to obtain the first image comprising image information of an edge of the to-be-tested substrate, the curved substrate bubble detection system further comprises a first processing circuit configured to determine location information of the defect region of the to-be-tested substrate according to the first image, and generate the second image comprising image information of the defect region, the curved substrate bubble detection system further comprises a second processing circuit configured to binarize the second image, and determine that the to-be-tested substrate has a bubble defect in case that there are at least two bright spots in an obtained binarized image, and a distance between any two first bright spots of at least two first bright spots is less than the first preset value, the first processing circuit is configured to compare brightness values of pixels in the first image with a first threshold value, adjust the brightness value of any pixel whose brightness value is greater than the first threshold value to a first brightness value, and adjust the brightness value of any pixel whose brightness value is less than the first threshold value to a second brightness value, wherein a location on the to-be-tested substrate corresponding to the pixel with the first brightness value is a location of the first side edge of the to-be-tested substrate, the first side edge comprises a straight portion and arc portions at two ends of the straight portion, and the first processing circuit is further configured to select, with the location of the first side edge as a reference, a rectangular area in each of regions of an active display region of the to-be-tested substrate that are close to the arc portions respectively to obtain the second image.

8. The curved substrate bubble detection system according to claim 7, wherein the first image is a rectangular image, and has a length a in a first direction and a length b in a second direction, the first direction is an extending direction of the straight portion, and the second direction is perpendicular to the first direction, the first processing circuit is further configured to establish a coordinate system with the first direction being a y direction, the second direction being an x direction, and a vertex of the first image close to the first side edge being an origin, the first processing circuit is further configured to determine an intersection point (x, y) of an extension line of the straight portion and an extension line of a straight portion of a second side edge of the to-be-tested substrate according to the first side edge, and determine coordinates (x+x1, y) of a first vertex of the defect region according to the intersection point (x, y) and a distance x1 between the first side edge and the active display region, and the first processing circuit is further configured to select a rectangular area in the active display region of the to-be-tested substrate on the basis of the first vertex to obtain the second image, wherein a length of an edge of the rectangular area in a direction parallel to the first direction is a preset value y1, and a length of an edge of the rectangular area in the second direction is b−x−x1.

9. The curved substrate bubble detection system according to claim 7, wherein the second processing circuit is configured to compare brightness values of pixels in the second image with a second threshold value, adjust the brightness value of any pixel whose brightness value is greater than the second threshold value to a third brightness value, and adjust the brightness value of any pixel whose brightness value is less than the second threshold value to a fourth brightness value, a location corresponding to the pixel with the third brightness value being a location of the first bright spot, and the second processing circuit is further configured to compare a distance between two adjacent first bright spots with the first preset value, and determine that a location of the two adjacent first bright spots is a location of a bubble defect in case that the distance between the two adjacent first bright spots is less than the first preset value.

10. The curved substrate bubble detection system according to claim 9, wherein the second processing circuit is further configured to screen the first bright spots for the first bright spot having a shape conforming to a bubble shape.

11. The curved substrate bubble detection system according to claim 9, wherein the second processing circuit is further configured to compare brightness values of pixels in the second image with a third threshold value, adjust the brightness value of any pixel whose brightness value is greater than the third threshold value to a fifth brightness value, and adjust the brightness value of any pixel whose brightness value is less than the third threshold value to a sixth brightness value, a location corresponding to the pixel with the fifth brightness value being a location of a second bright spot, the third threshold value being less than the second threshold value, and the second processing circuit is further configured to determine that the second bright spot is a foreign matter defect in case that the second bright spot has a size greater than a second preset value, and has a shape not conforming to a bubble shape.

12. The curved substrate bubble detection system according to claim 11, wherein the second processing circuit is further configured to filter and dilate the second image.

13. The curved substrate bubble detection system according to claim 7, wherein the first light source and the second light source are both a monochromatic point light source.

14. The curved substrate bubble detection system according to claim 13, wherein the first light source and the second light source are both a blue point light source.

15. The curved substrate bubble detection system according to claim 7, wherein the linear array camera has a resolution >5 μm/pixel.

16. The curved substrate bubble detection system according to claim 7, further comprising a sensor configured to transmit a signal when the to-be-tested substrate is at a test location, and a control unit for controlling an operation state of the image acquisition structure, wherein the control unit receives the signal to control the image acquisition structure to start image acquisition.

17. The curved substrate bubble detection system according to claim 16, wherein the control unit is a programmable logic controller (PLC).

18. The curved substrate bubble detection system according to claim 7, further comprising a sorting and picking assembly for picking away a defective product in case that the second processing circuit determines that the to-be-tested substrate has the bubble defect.

* * * * *